United States Patent [19]
Berland

[11] Patent Number: 5,509,050
[45] Date of Patent: Apr. 16, 1996

[54] FACSIMILE RADIO COMMUNICATION SYSTEM HAVING MULTIPLE DATA SPEEDS

[75] Inventor: Kerry S. Berland, Chicago, Ill.

[73] Assignee: Quadphase Corporation, Chicago, Ill.

[21] Appl. No.: 123,446

[22] Filed: Sep. 17, 1993

Related U.S. Application Data

[63] Continuation-in-part of Ser. No. 685,831, Apr. 16, 1991, Pat. No. 5,282,238.

[51] Int. Cl.⁶ .................................................. H04Q 7/20
[52] U.S. Cl. .......................... 379/58; 379/100; 358/440; 358/442; 358/468
[58] Field of Search ...................... 379/58, 100; 370/79, 370/84; 358/405, 406, 468, 440, 442, 468; 455/34.1, 58.2

[56] References Cited

U.S. PATENT DOCUMENTS

| | | | |
|---|---|---|---|
| 4,630,126 | 12/1986 | Kaku et al. | 358/406 |
| 5,021,890 | 6/1991 | Yoshida et al. | 358/405 |
| 5,021,892 | 6/1991 | Kita et al. | 358/468 |
| 5,050,004 | 9/1991 | Morton, Jr. | 358/405 |
| 5,159,465 | 10/1992 | Maemura et al. | 358/405 |
| 5,351,134 | 9/1994 | Yaguchi et al. | 358/405 |

*Primary Examiner*—Dwayne D. Bost
*Attorney, Agent, or Firm*—Lockwood, Alex, Fitzgibbon & Cummings

[57] ABSTRACT

A communication system which enables conventional telephone-type facsimile apparatus to reliably and efficiently communicate over a conventional two-way voice radio communication system. The system includes an interface unit which is connected to the facsimile aparatus and to the transceiver apparatus of the radio communication system without modification to either unit. The interface unit transmits and receives information over the radio system in the form of a series of data packets, each containing check digit information to verify transmission accuracy. To optimize data transmission in the presence of weak signals or noise on the radio channel, the packet speed for a link between two stations is selected adoptively as the highest available data speed which yields a predetermined minimum packet error rate.

6 Claims, 3 Drawing Sheets

FIG. 1

FIG. 4
TYPICAL DATA PACKET

FACSIMILE RADIO COMMUNICATION SYSTEM HAVING MULTIPLE DATA SPEEDS

This application is a Continuation-in-Part of application Ser. No. 685,831, filed Apr. 16, 1991 now U.S. Pat. No. 5,282,238.

BACKGROUND OF THE INVENTION

This invention relates in general to a communications interface device whereby a facsimile transceiver is enabled to send and receive copies of documents over a two-way voice radio transceiver; and more particularly to a communications interface device which contains electrical interface means which, when connected to a standard facsimile transceiver, simulate a two-wire public switched telephone line; which contains facsimile data modulator and demodulator means for converting facsimile image data into audible tones, and audible tones into facsimile image data; which contains destination addressing means to allow a user to selectively transmit a facsimile message to any one of multiple compatible devices on the same channel; which provides error detection and correction means which assure error-free communications over the radio channel; which contains radio interface means which, connected to a voice radio, simulate an external microphone, talk switch, and speaker, and wherein the data transmission speed is automatically optimized for existing radio channel conditions.

Facsimile transceivers have commonly been used to send and receive copies of written documents over two-wire voice telephone lines. Such a facsimile transceiver contains station selection (dialing) means to place calls over the public switched voice telephone network; answering means to detect ringing signals from the telephone central office; and electrical coupling means to send and receive analog electrical signals in the voice frequency range, at signal levels and frequencies compatible with the voice telephone network. Such a facsimile transceiver also contains optoelectronic document scanning means, which, for each horizontal scan line of a predetermined height across the document to be copied, produce a string of digital data, where, for example, a binary one digit represents a black picture element of a predetermined size, and a binary zero digit represents a white picture element. Such a transceiver also contains modulation means which, for transmission, convert digital image data into tones in the voice frequency range, as well as demodulation means which, for reception, convert audio tones into binary image data. Such a facsimile transceiver also contains hard-copy printing means, such as a thermal print mechanism which makes images by selectively heating elements on a thermal print head in contact with thermally-sensitive paper, or a laser print mechanism which produces images on bond paper using a xerographic process, or similar print mechanism; such printing means converting the received digital image data into a printed document, and reproducing a copy of the transmitted document. Such facsimile transceiver also includes a timing and control means which control and coordinate the above elements in accordance with procedures and protocols established by telephone authorities and by international telecommunications standards bodies.

There are many applications where it is desirable to send and receive documents using such a facsimile transceiver, but where telephone lines are not available. Examples include mobile vehicles, temporary work locations, and remote and undeveloped areas. One such radio data system is the facsimile-radio communication system described in related U.S. patent application Ser. No. 685,831, filed Apr. 16, 1991. As set forth in detail in this patent application, the facsimile radio communications interface device enables a facsimile transceiver to send and receive copies of documents over a two-way voice radio transceiver, and includes electrical interface means which, when connected to a standard facsimile transceiver, simulate a two-wire public switched telephone line; facsimile data modulator and demodulator means for converting facsimile image data into audible tones, and audible tones into facsimile image data; destination addressing means to allow a user to selectively transmit a facsimile message to any one of multiple compatible devices on the same radio channel; error detection and correction means which assure error-free communications over the radio channel; and radio interface means which, connected to a voice radio, simulate an external microphone, talk switch, and speaker.

High data transmission speeds are desirable in any system where digital information is transmitted over radio. High transmission speeds are especially desirable when large amounts of data must be communicated, as in facsimile-radio communication systems. Facsimile images are data-intensive, typically requiring as many as 262,000 bits (binary digits) or more to be transmitted to reproduce each 8½ by 11 inch page.

It would be ideal for a radio data system to be able to transmit all data at the fastest available speed, for example, 9600 bps (bits per second). Unfortunately, in practice higher data speeds may be realizable only when radio propagation conditions are very good. When the received radio signal strength is weak, or when the radio channel is noisy, it may be necessary to use a lower speed.

It is known to those familiar with the art of digital data communications that the BER (bit error rate), or the probability that a given binary digit will be received in error, tends to increase as the noise level on the communications channel increases relative to the strength of the signal. For example, one common method of sending digital data by radio is to encode binary digits in the form of audible tones in the voice frequency spectrum of from 300 to 3400 Hz (Hertz, or cycles per second), and then to transmit these tones over the radio channel. Encoding schemes for sending digital data may include, for example, FSK (frequency shift keying), whereby binary 1s and 0s are sent as audio tones with two distinct frequencies; MSK (minimum shift keying), a variation of FSK in which the frequency shift is minimized to reduce RF channel bandwidth; PSK (phase shift keying), whereby binary digits are encoded as changes in the phase of an audio frequency tone; or QAM (quadrature amplitude modulation), whereby binary digits are encoded using both the phase and the amplitude of an audio frequency tone; and other encoding techniques may also be employed.

The relationship of BER to communications channel noise level may be understood by the example of one commercially available modem integrated circuit, which supports data speeds of 9600, 7200, 4800, 2400, and 300 bps, as follows. For example, assume a desired BER of 10-4 (1/10,000), or an error rate whereby a single bit error is probable for every 10,000 bits. To achieve a BER of 10-4 at 9600 bps for this modem circuit, the SNR (signal to noise ratio, the quotient of the power of the received audio signal tones, representing the transmitted binary digits, divided by the power of the noise component of the received audio signal, caused primarily by noise on the communications channel) must be 21 dB (decibels). By reducing the data speed from 9600 bps, this modem device can maintain the same desired 10-4 BER level in the presence of increasingly unfavorable communications conditions (decreasing SNR), as follows:

At 9600 bps, requires 21 dB SNR, or noise voltage of up to 9% of signal voltage.

At 7200 bps, requires 17 dB SNR, or noise voltage of up to 14% of signal voltage.

At 4800 bps, requires 15 dB SNR, or noise voltage of up to 18% of signal voltage.

At 2400 bps, requires 8 dB SNR, or noise voltage of up to 40% of signal voltage.

At 300 bps, requires 5 dB SNR, or noise voltage of up to 56% of signal voltage.

While these specific figures on noise sensitivity would not apply exactly to other specific modem devices, it is generally the case that by decreasing data speed (in bps), a greater effective immunity to noise can be achieved.

Requiring users to select a single high fixed speed (such as 9600 bps) might limit transmissions to only those situations where very good reception can be expected. On the other hand, requiring users to select a single, relatively lower fixed speed (such as 2400 bps) might needlessly slow down transmission speeds when higher speeds are often possible.

To provide the greatest flexibility, it is desirable to allow devices to communicate at multiple speeds—for example, at 9600, 7200, 4800, 2400, and 300 bps—on an adaptive basis. The devices should automatically use the highest speed that produces acceptable error rates. For example, the criterion might be established that the link should provide a specified modem BER, for example, 10-4. Two units close together with good radio propagation might be able to communicate at 9600 bps. Two more distant stations may have to use a lower speed, for example, to 2400 bps.

To avoid channel congestion and assure reasonable network message throughput in a multi-user radio data network, it is desirable to design the communication system such that packets are received free of errors most of the time. Otherwise, an excessive proportion of the transmission time available on the network will be dedicated to packet retransmissions, using an error detection and correction scheme such as that described for facsimile-radio communication systems in related patent application Ser. No. 685,831. For example, assume that the BER experienced under prevailing radio propagation characteristics is 10-4 ; (1 in 10,000), and that information is transmitted in packets containing 1,024 bits. This BER could be expected to result in a faulty packet about once every 10 packets (10,240 bits). Approximately 10% of the packets would have to be retransmitted. A 10% packet retransmission rate is tolerable, but if packet retransmission increases significantly beyond that ratio, channel throughput would be degraded to the point that users could not expect prompt and reliable communications.

When communicating over the telephone network, facsimile transceivers automatically change their data speed to adapt to noise levels on the telephone lines. They implement a standard procedure according to a protocol established by international communications standards. The facsimile connection starts at the relatively low speed of 300 bps, during which the sending and receiving transceivers exchange data concerning their respective capabilities, including the maximum data speed at which each is capable of communicating. Assuming that both facsimile transceivers have signaled that they can communicate at a 9600 bps rate, the originating party then sends a training sequence (a predetermined data pattern) at 9600 bps; then drops back to 300 bps and listens. The answering party sends back a 300 bps message which either positively acknowledges reception of the training sequence at 9600 bps—in which case both facsimile transceivers switch to 9600 bps and data communications starts—or else negatively acknowledges training—in which case the originator selects the next lower available speed (typically 7200 bps), and sends a training sequence at this lower speed—repeating until training is successful. If training is unsuccessful at all available data speeds, the call cannot be completed.

In a voice telephone system, the switched telephone network provides a separate circuit path for each voice connection, so that simultaneous conversations do not mutually interfere. However, in a radio environment, multiple devices share the same radio channel, to allow connectivity among many users, and to optimize usage of radio frequency spectrum. Because more than two data modem devices may often be active at the same time, thus interspersing packets, the use of multiple data speeds may give rise to transmission errors.

It is desirable in any network of communications devices for each device to continually monitor the communications channel, so as provide orderly access to the channel, and provide suitable responses to all signals sent to that device. In a network of multiple radio data units where transmissions may occur at varying data speeds, traffic on the radio channel may be unintelligible as among units which have selected varying data speeds. Owing to the complexity of the data demodulation processes involved, practical data demodulator circuits can successfully receive only one data speed at a time. The unit must be set to any one of (for example) 300, 2400, 4800, 7200, or 9600 bps, and thereafter can decode only that data speed, until reset. Suppose a network of three radio data communications units: #1, #2, and #3. Units #1 and #2 are "connected" at 4800 bps; that is, a previous exchange of packets between units #1 and #2 has been made, resulting in a virtual "connection" over the radio, at 4800 bps. While this connection is in place, unit #3 attempts to "connect" to unit #2 by sending a 9600 bps connection request packet, inserted into a time gap in packets exchanged between units #1 and #2. In this event, unit #2 should detect the connection request packet from unit #3, and return a busy packet to unit #3 to indicate that it cannot currently make a connection. If no provision were made to accommodate the differing data speeds, then the 9600 bps connection request packet could not readily be detected; no busy packet would be returned; and the operator of unit #3 would have no way to distinguish whether the intended recipient of his message is busy, or the equipment is out of order. This would be undesirable, since any communications network should provide users with indications as to message status to provide confidence in the integrity of the system.

Further, when set to one specific data speed, a demodulator device may not be able to distinguish between valid data at a different speed, and noise on the radio channel, and might therefore attempt to transmit a packet while another unit is transmitting at an incompatible speed, thereby causing packet collisions, and adversely affecting channel throughput.

Despite the desirability of multi-speed data operation for the aforesaid reasons, multiple data speeds have in the past been impractical in radio data networks, since, owing to the practical limitations of modem devices, packets sent at different data speeds would be mutually unintelligible. This would violate the requirement for continual communications status monitoring by all modem devices, and in some cases lead to unnecessary packet collisions. These problems have in the past restricted practical multi-user radio data modem networks to operation at a single fixed speed.

It is therefore a primary object of the present invention to provide a radio data communication system which permits multiple radio data communication devices to operate at differing data speeds over the same radio channel, optimizing data throughput by transmitting at higher speeds when radio propagation conditions permit, and at lower speeds when necessary to overcome poor signal conditions.

A more specific object of the present invention is to provide a means of determining the optimum information packet speed for a pair of radio data communication devices, based on prevailing radio propagation conditions, by causing each transmitting station to send a predetermined data sequence to the receiver, and the receiving station to return a packet indicating whether the data sequence was received with an error rate no greater than a predetermined level; if successful, by establishing that data speed as the information packet speed to be used in subsequent transmissions of information packets, but if the error rate was exceeded, by causing the transmitting station to reduce its speed to the next lower available speed, and to generate a new data sequence—repeating such procedure until the desired error rate is achieved, whereupon this lower data speed is adopted as the information packet speed.

A further object of the present invention is to regulate channel access by radio data communications units which may have adopted varying data speeds, and to avoid collisions that might otherwise be caused due to the mutual unintelligibility of packets sent at varying speeds, by establishing a network packet speed, typically the lowest available data speed; by causing all network control packets to be transmitted at this network packet speed; by causing a transmitting unit to generate a channel reservation packet, at network packet speed, reserving the channel for a specified number of seconds, prior to sending an information packet at a higher information packet speed; by causing a receiving unit to generate a reservation acceptance packet, at network packet speed, to signal its recognition of the upcoming information packet; and by causing all units in the respective vicinities of the transmitter and the receiver to take notice of such reservation packets, so that they will not attempt to gain channel access during the specified channel reservation period, thereby avoiding packet collisions.

Various means have been developed to send and receive digital data over wireless radio links. A radio modem, for example, may be connected between a computer or data terminal and a radio transceiver. The means for data transfer between the computer or data terminal and the radio modem comprise a direct electrical connection of two closely-located data devices, for example, an RS-232 serial data interface (Electrical Industries Association Standard RS-232). The radio modem contains means for converting digital data received from the computer or data terminal into electrical signals which modulate the carrier of the connected transceiver. Conversely, the radio modem demodulates signals received from the radio so as to regenerate digital data, and passes the data to the connected computer or data terminal.

SUMMARY OF THE INVENTION

The invention is directed to a digital facsimile radio communication system wherein network packet speed is established by pre-agreement between all users on a radio channel. The network packet speed is chosen to provide reasonably assured transmission under typical expected radio propagation conditions, such that the probability is low that packet retransmissions will be required. This speed might typically be 300 bps, in the case where speeds of 300, 2400, 4800, 7200, and 9600 bps are provided, and would typically be the lowest data speed in the case where a different range of data speeds were provided. All data packets intended for establishing link connections, acknowledging previously received data packets, and all other data link and network control functions—but not containing actual message information—are defined as network control data packets and are sent at the network packet speed exclusively. After a connection has been initially established between two parties, the parties determine whether it is possible to communicate reliably at any higher speed than the network packet speed, through a negotiation procedure consisting of a series of training sequences. The highest resulting speed is designated the information packet speed for this connection between these two parties. The information packet speed may vary as among different parties on the same network; may vary as between the same parties at different times, depending on the current radio propagation characteristics; and may be renegotiated during a link connection, for example, when either party detects that the BER or packet retransmission rate has increased, in response to an appropriate control data packet sent from one connected party to the other.

The invention is further directed to a digital facsimile communication system wherein packets which contain user message data or information to be delivered to the remote destination are sent within a special multi-packet sequence, each sequence normally containing these four packets:

1. Channel reservation packet. Sent at network packet speed from the message originator to the message receiver. Includes the address of the sending unit, the address of the receiving unit, and a proposed time period (in seconds) for which the channel is to be reserved. This reservation time is calculated by the transmitting device to allow sufficient time for transmission of the data packet it is prepared to send, plus time for the other network packets included in this data packet sequence.

2. Reservation acceptance packet. Sent at network packet speed from the message receiver, back to the message originator. Includes the addresses of both units, and the time period (in seconds) for which the channel will be reserved.

3. Information data packet. Sent at data packet speed from the message originator to the message receiver.

4. Information acknowledgment data packet. Sent at network packet speed from the message receiver, back to the message originator. When sent, positively acknowledges receipt of the information data packet just transmitted.

Each unit ordinarily sets its internal demodulator device to the network packet speed. It changes its demodulator to a higher information packet speed only after it has received a channel reservation data packet addressed to this unit, and has returned a reservation acceptance data packet to the originating unit. After receiving the information data packet—or upon expiration of the specified channel reservation time—the unit resets its demodulator back to the network packet speed.

The invention is further directed to a digital radio facsimile communication system wherein each unit within radio reception range of the message originator monitors the channel reservation data packet at the beginning of an information data packet sequence. When the data packet is not addressed to that unit, the facsimile-radio communication device sets an internal timer to the designated reservation time. During that time, this unit does not attempt to transmit on the radio channel. This assures that this unit will not interfere with the information data packet sequence in progress, even though it may not be able to monitor the data packet being transmitted at a different speed. Each unit within radio reception range of the message receiver monitors the channel acceptance data packet. Each unit (other than the originator) sets its internal timer to the designated reservation time, and, during this time, will not attempt to transmit on the radio channel. It will be seen that the originator's channel reservation data packet will tend to eliminate interfering data packets generated by units in the vicinity of the originator, while the receiver's channel acceptance data packet will tend to eliminate interfering data packets generated by units in the vicinity of the message receiver.

The invention is further directed to a digital radio facsimile communication system wherein information data packets, which tend to be far longer than network control data packets, and for which high speed is therefore the most important, are sent at the highest practical speed. Furthermore, each pair of stations on the radio channel may operate at differing data speeds, as may be appropriate to the radio propagation conditions applying to that pair of stations. Network control data packets are not necessarily sent at the highest possible data speed, leading to some loss of the theoretically realizable network throughput. However, these network control data packets are usually quite short, containing only address and control data but no user information, leading to minimal throughput loss; but more importantly, any throughput loss is repaid by allowing all units on the network to interoperate no matter which higher data speed may be in effect for each pair of connected stations.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
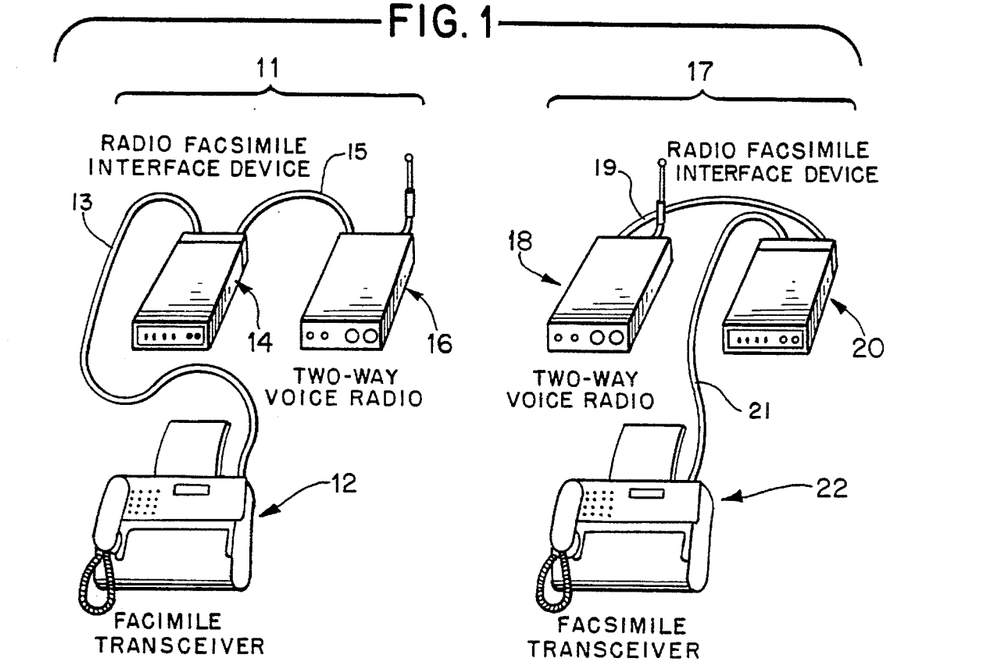
FIG. 1 shows two radio-facsimile communications systems comprising two stations, each consisting of a facsimile transceiver, a radio-facsimile interface device, and a two-way voice radio, together with interconnecting cables, illustrating a typical application of the invention.

Referring to FIG. 1, a radio-facsimile communications station 11 is seen to comprise a facsimile transceiver 12, connected via a cable 13 to a radio-facsimile interface device 14. Radio-facsimile interface device 13 is connected via a cable 15 to a two-way voice radio 16.

A second identical radio-facsimile communications station 17 comprises a two-way voice radio 18, a cable 19, a radio-facsimile interface device 20, a cable 21, and a facsimile transceiver 22. This second station 17 is typically located remotely from the first station 11, at a maximum distance determined by the range of the radio equipment employed.

In accordance with the invention, a user is enabled to send a facsimile copy of a written message from one station to another in substantially the same manner as though operating on the voice telephone network. For example, the user places the original written document to be transmitted in the facsimile transceiver 12, and, using the ordinary facsimile calling procedure, dials the "telephone number" of the station to which he desires to send the message (each such station having been, by common agreement, assigned a unique number which is programmed into its respective radio-facsimile interface device by a suitable programming facility). The radio-facsimile interface device 14 provides all required voice telephone network signalling to the connected facsimile transceiver 12. It recognizes dual-tone multi-frequency (DTMF) and/or pulse dialing signals, generated by the facsimile transceiver 12, thereby decoding the "telephone number" of the station to which the user wishes to send a facsimile message.

When the user has finished "dialing" radio-facsimile interface device 14 sends audible tones, encoded as electrical signals, to two-way voice radio 16, which are transmitted to two-way voice radio 18 and decoded by the other radio-facsimile interface device 20. Radio-facsimile interface device 20 accordingly generates a telephone line ringing signal over cable 21 to its connected facsimile transceiver 22, preparing the device to accept a message, and also sends an answering response over two-way voice radio 18 back to the originating station 11, to signal that this station 17 is ready to receive the facsimile message.

Radio-facsimile interface device 14 now sends audible tones to originating facsimile transceiver 12 signifying that a "connection" has been made. Facsimile transceiver 12 proceeds to send the facsimile call set-up tones prescribed by applicable telecommunications standards, which are responded to by radio-facsimile interface device 14. Facsimile transceiver 12 now proceeds with its normal transmission mode: it scans the original document optoelectronically; converts black and white images into digital data; converts digital image data into audible tones; and transmits these tones over cable 13 to the radio-facsimile interface device 14.

Radio-facsimile interface device 14 converts the tones received from originating facsimile transceiver 12 back into the form of digital data. As will be subsequently described in more complete detail, radio-facsimile interface device 14 combines the original facsimile image data with station addressing information as well as error detection and correction information. It then re-encodes this combined information data into audible tones, and passes these tones over cable 15 to two-way voice radio 16.

Receiving two-way voice radio 18 passes received audible tones over cable 19 to radio-facsimile interface device 20, which demodulates these tones and converts them to digital data. Provided that the information has been received without error (as will be subsequently described), radio-facsimile interface device 20 re-encodes the digital image data into audible tones, and sends these tones over cable 21 to the receiving facsimile transceiver 22.

From the preceding description it will be seen that radio-facsimile interface devices 14 and 20, through their respective connections to two-way voice radios 16 and 18, automatically deliver a facsimile message from one radio-facsimile communications station 11 to the other station 17 without manual control of the communications link by the operator. In a like manner, the operator at radio-facsimile communications station 17 can send a facsimile message to station 11; the same procedure takes place, in the reverse direction.

Figure 2:
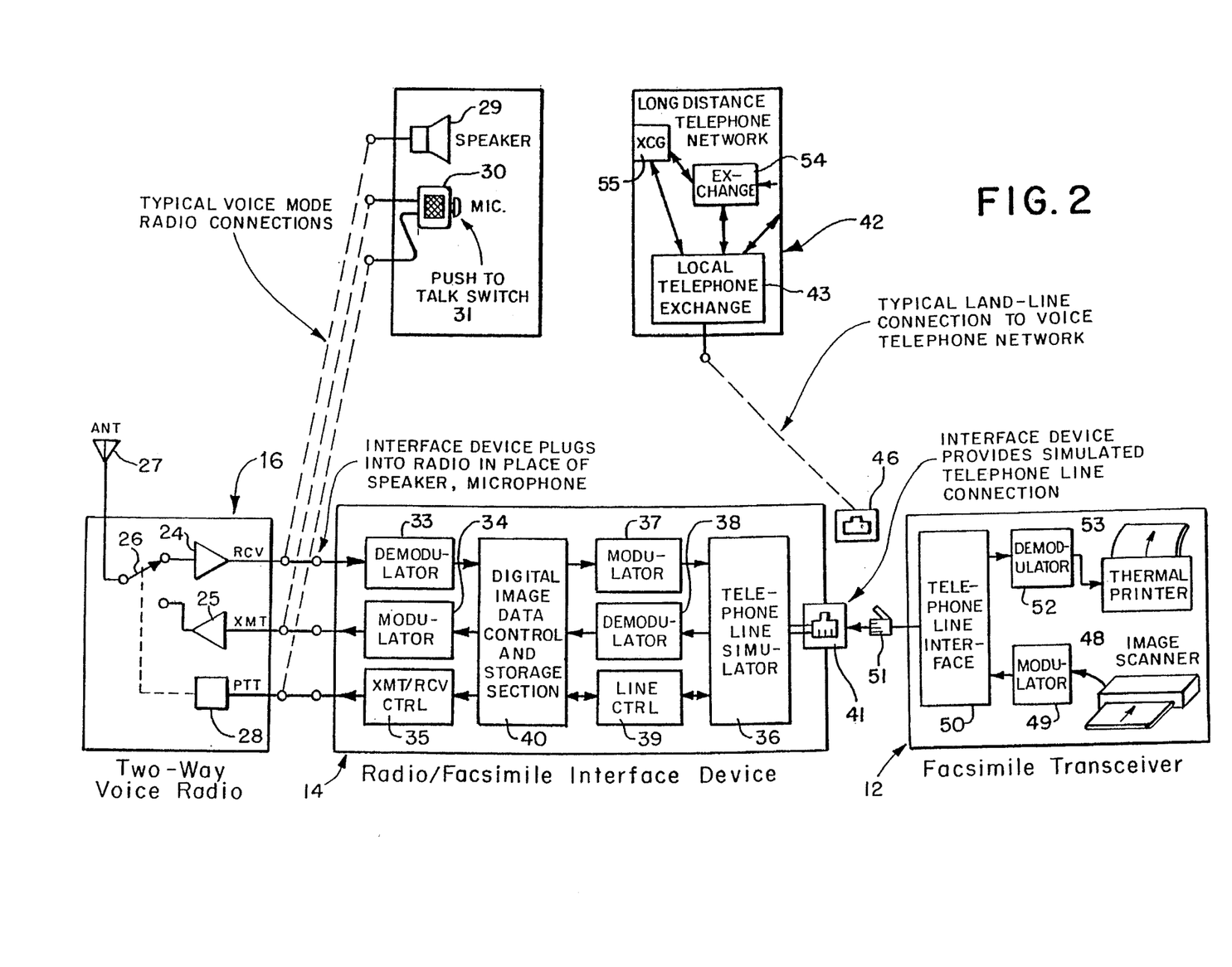
FIG. 2 is a simplified block diagram illustrating that, with respect to the two-way voice radio, the radio-facsimile interface device effectively simulates a microphone and a speaker; and, with respect to the facsimile transceiver, the radio-facsimile interface device effectively simulates the voice telephone network.

FIG. 2 is a block diagram illustrating the radio-facsimile interface device simulating a microphone and a speaker (to the two-way voice radio) and the voice telephone network (to the facsimile transceiver).

Referring to FIG. 2, two-way voice radio 16 comprises a receiver stage 24 and a transmitter stage 25, either of which can be connected through an antenna switch 26 to a radio antenna 27. In its standby condition, the radio is in receive mode; the antenna 27 is connected through antenna switch 26 to receiver stage 24. In a typical voice-mode radio connection, receiver stage 24 is connected to a speaker 29, and a microphone 30 connected to transmitter stage 25. When a user wishes to speak, he depresses a push-to-talk switch 31 on the microphone activating a push-to-talk stage 28 within the radio, which in turn conditions the antenna switch 26 into its transmit mode, connecting the antenna 27 to transmitter stage 25.

When the radio/facsimile interface device 14 is connected to the two-way voice radio 16, the radio receiver stage 24 is connected to a demodulator 33 which converts audible tones to digital data. Demodulator 33 accepts audible signals that would be connected to speaker 29 in a voice-mode system. The radio transmitter stage 25 is driven by a modulator 34 which converts digital data within the radio-facsimile interface device 14 to audible tones. Modulator 34 provides audible signals that would be generated by microphone 30 in a voice-mode system. The radio PTT stage 28 is controlled by transmit-receive control device 35. The transmit-receive control device 35 places the radio in transmit mode in the same manner as the push-to-talk switch 31 in a voice system.

Because the radio-facsimile interface device 14 in effect emulates the operation of a speaker 29 and microphone 30, it can be connected to a wide variety of two-way voice radios without modification to those radios, except that differing cable connections may be required for different radios.

FIG. 2 also shows facsimile transceiver 12 in simplified form. It includes an image scanner 48, which optoelectronically converts the image of an original document into digital data. This information is converted by a modulator 49 into audible tones. These tones are routed to a telephone line interface 50.

Telephone line interface 50 also connects to a demodulator 52, converting received audible tones into digital data. This information is sent to a thermal printer 53, which reproduces the image of the original document transmitted from a compatible facsimile transceiver.

In a telephone line application, facsimile transceiver 12 is connected through a telephone cable 51 to a telephone jack 46, which is a terminal on a switched voice telephone network 42. The local telephone exchange 43 provides a gateway into the telephone network, and makes connections to other exchanges 54 and 55 in response to the number dialed by the originating party.

When facsimile transceiver 12 is connected to radio/facsimile interface device 14, telephone line cable 51 connects to telephone receptacle 41. The radio-facsimile interface device 14 contains a telephone line simulator 36, which simulates the operation of the switched telephone network 42. This telephone line simulator 36 furnishes telephone line loop current; recognizes when the facsimile transceiver goes off-hook, preparatory to dialing; generates an audible "dial tone" compatible with the telephone network standards; recognizes dual-tone multi-frequency (DTMF) and/or pulse dialing signals, generated by the facsimile transceiver 12; and can generate a telephone line ringing signal.

Audible tones received by radio-facsimile interface device 14 via its telephone line simulator 36 from the attached facsimile transceiver 12 are converted by demodulator 38 into digital data. This information is stored by a digital image data control and storage section 40 for subsequent transmission to the distant receiver over the attached two-way voice radio 16.

Facsimile image data received by radio-facsimile interface device 14 from the attached two-way voice radio 16 is routed via a demodulator 33 to the digital image data control and storage section 40. Error-free image information is converted into audible tones by a modulator 37, and converted by telephone line simulator 36 into electrical signals appropriate to drive facsimile transceiver 12. A line control circuit 39 provides control of the telephone line simulation accomplished by telephone line simulator 36.

It should be noted that radio-facsimile interface device 14 does not simply change electrical levels in such a way as to route modulated audio tones directly and in real-time between two-way voice radio 16 and facsimile transceiver 12. Rather, radio-facsimile interface device 14 contains an independent modulator 34 and demodulator 33 for interface to two-way voice radio 16; an independent modulator 37 and demodulator 38 for interface to facsimile transceiver 12; and a digital image data control and storage section 40 for providing separate and independent control of data flow to and from two-way voice radio 16 and facsimile transceiver 12. These provisions are utilized to provide station addressing and error control.

Figure 3:
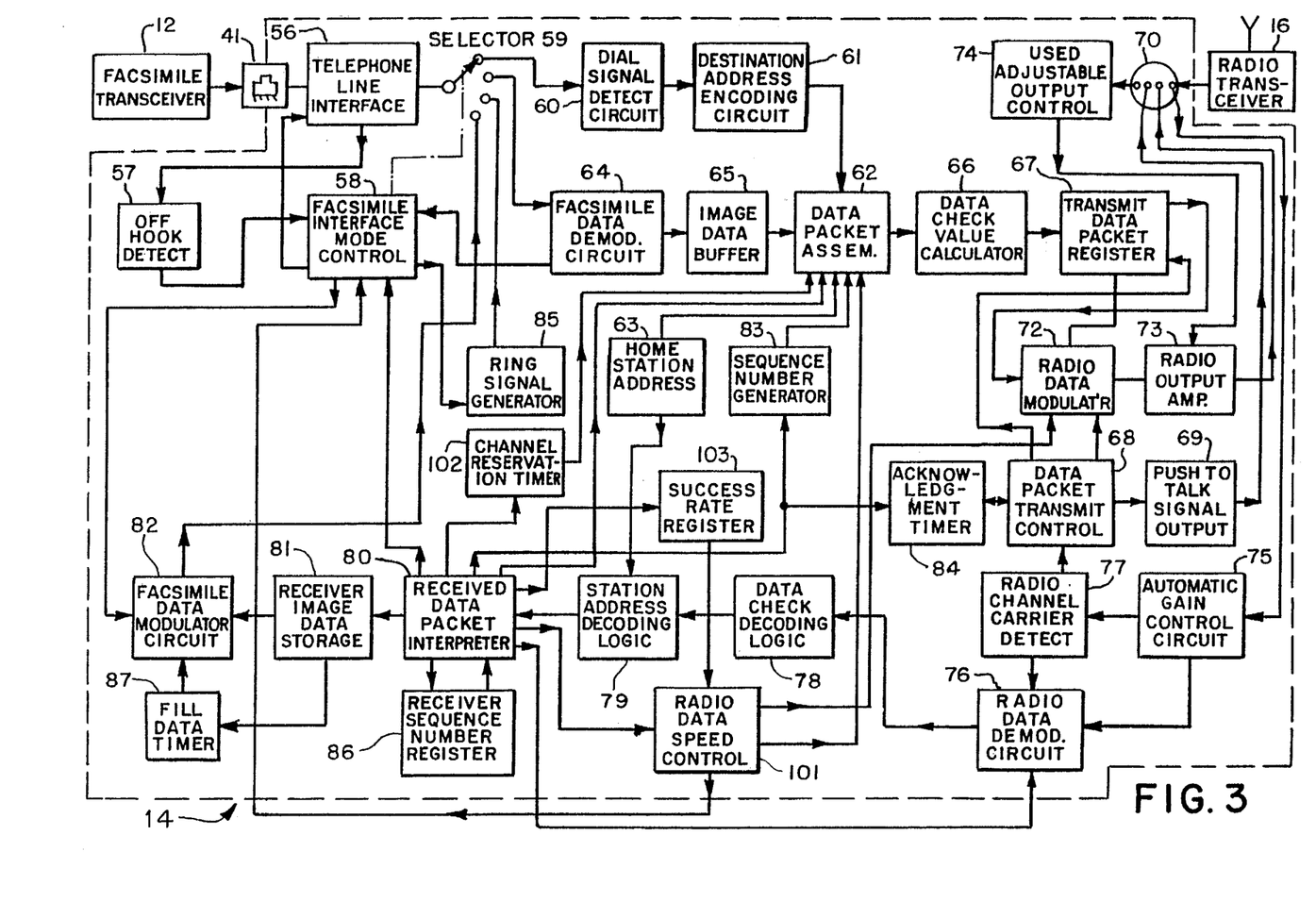
FIG. 3 is a simplified functional block diagram of the radio-facsimile interface device illustrating the station addressing, error detection and correction, speed control and channel reservation functions of the device.

FIG. 3 provides an expanded view of the internal functions of the radio-facsimile interface device, particularly, with respect to the station addressing, error control, speed control and channel functions.

Referring to FIG. 3, facsimile transceiver 12 connects view telephone jack 41 to telephone line interface 56. Telephone line interface 56 provides telephone line "battery" voltage to attached facsimile transceiver 12. Assume that the operator of facsimile transceiver 12 wishes to originate a call. Facsimile transceiver 12 goes "off-hook" by closing an internal switch or relay contact, drawing loop current from the voltage provided by telephone line interface current 56. This loop current is detected by off-hook detector circuit 57, which provides a signal to facsimile interface mode control circuit 58, which in turn causes selector switch 59 to connect telephone line interface 56 to dial signal detect circuit 60. Dial signal detect circuit 60 receives DTMF tones or dial pulses from attached facsimile transceiver 12. Upon completion of dialing—either upon reception of a predetermined number of digits, or upon reception of a predetermined terminating digit or symbol (such as the "#" symbol)—dial signal detect circuit 60 transmits the station number dialed to destination address encoding circuit 61.

Data packet assembler 62 assembles an initial data packet which includes the destination station address received from destination address encoding circuit 61 in binary digital form. Data packet assembler 62 also includes the address of this radio-facsimile communications station, as programmed by the installer and contained in a home station address register 63. Since no image data has as yet been accumulated from the transmitting facsimile transceiver 12 by image data demodulator circuit 64 and image data buffer 65, this data packet does not contain image data. Data packet assembler 62 instead inserts a digital code indicating that this data packet is a channel reservation data packet, rather than an information transfer data packet. Data packet assembler 62 next inserts a digital value indicating the amount of time in seconds for which the channel is to be reserved. If no image data is as yet available for transmission, a minimum reservation time is specified, for example, five seconds, so as to reserve the channel until the distant radio-facsimile communication station has time to respond. Data packet assembler 62 also inserts a digital code reflecting the radio data speed to be used, as received from radio data speed control 101. For example, "96" to denote 9600 bps, "48" for 4800 bps, etc.

Data packet assembler 62 forwards the data packet to data check value calculator 66, which appends a cyclical redundancy check (CRC) value to the data packet (to be explained in further detail below), and forwards the modified data packet to transmit data packet register 67. Transmit data packet register 67 generates a signal to data packet transmitter control 68 indicating that a data packet is ready to transmit. Provided that the radio channel is not already busy, data packet transmit control 68 energizes push-to-talk signal circuit 69, which is connected through a radio connector 70 to radio transceiver 16, causing the transceiver to switch from receive to transmit. Data packet transmit control 68 also signals a radio data modulator circuit 72 to begin generating audible tones, which are amplified by a radio output amplifier 73 to a suitable electrical level, then connected via radio interface connector 70 to radio transceiver 16. After suitable delays, both to allow radio transceiver 16 to switch to its transmit mode, and to allow radio modulator circuit 72 to complete its pre-data signal sequence, data packet transmit control 68 signals transmit data packet register 67 to transmit the stored data packet to radio data modulator circuit 72. Radio data modulator circuit 72 converts the digital data to audible tones, which are amplified by radio output amplifier 73 to a suitable electrical level, then connected via radio interface connector 70 to radio transceiver 16. At this phase, radio data modulator 72 operates at its lowest modulation rate, the network packet speed, and continues to do so until commanded to a higher data packet speed by radio data speed control 101.

Since different models of radio transceiver 16 may require differing signal strengths to provide effective operation, a user-adjustable output control 74 allows the equipment installer to program a specific output level.

After the initial data packet is transmitted, data packet transmit control 68 reconditions push-to-talk signal circuit 69 to its receive status, and radio transceiver 16 returns to its receive mode.

If the distant radio-facsimile communications station receives the data packet just transmitted, it returns an acknowledging data packet to this radio facsimile communications station. The received audio signal from radio transceiver 16 is coupled through radio interface connector 70 to an automatic gain control circuit 75, which automatically adjusts for variations in radio receive levels and passes audio tones to a radio data demodulator circuit 76.

Automatic gain control circuit 75 also passes audio tones to a radio channel carrier detect circuit 77, which develops a signal indicating the presence of a data carrier signal on the radio channel. This signal is connected to radio demodulator circuit 76, helping to prevent radio demodulator circuit 76 from falsely interpreting radio noise as data. The signal developed by radio channel carrier detect circuit 77 is also connected to data packet transmit control circuit 68 inhibiting the station from attempting to transmit when another signal is already present on this radio channel.

At this time, radio data demodulator circuit 76 is set to demodulate signals at its lowest modulation rate, the network packet speed, and continues in this setting until commanded to a higher data packet speed by a received data packet interpreter 80.

Radio demodulator circuit 76 converts received audible tones into digital data, passing the information to a data check decoding logic circuit 78. Data check decoding logic circuit 78 removes the CRC embedded in the received data packet, then independently calculates a CRC check on the remainder of the received data packet. If the CRC check so calculated does not agree with the CRC included in the received data packet, data check decoding logic circuit 78 discards this data packet. If the CRC agrees, it passes the data packet to a station address decoding logic circuit 79.

Station address decoding logic circuit 79 examines the address to which the packet was addressed, comparing this address to the address of this radio-facsimile communications station, as contained in home station address register 63. If these addresses do not compare, the data packet is intended for another radio-facsimile communications station. If the address contained in the received data packet matches, then the data packet is intended for this radio-facsimile communications station. In either case, station address decoding logic circuit 79 passes the data packet to the received data packet interpreter circuit 80, along with a signal indicating the results of the destination address comparison.

If received data packet interpreter 80 determines that this packet is a channel reservation packet addressed to another radio-facsimile communications station, it extracts the channel reservation time period encoded in the packet and passes that value to channel reservation timer 102. Channel reservation timer 102 loads this value and starts a count-down to zero. So long as channel reservation timer 102 holds a non-zero timer value, it produces an inhibit signal to data packet assembler 62, effectively preventing this radio-facsimile communication station from transmitting, and allowing the distant radio-facsimile communication station to reserve the channel.

Continuing however with the case just described, received data packet interpreter 80 finds within the data packet a control code showing that this is a reservation acceptance packet, which indicates that the distant radio-facsimile communications station is ready to accept a connection, in response to the channel reservation data packet just sent. Received data packet interpreter 80 now sends a signal to facsimile interface control circuit 58, indicating that the system is ready to receive a facsimile message from connected facsimile transceiver 12. Facsimile interface mode control circuit 58 switches selector switch 59 to connect telephone line interface circuit 56 to facsimile data modulator circuit 82. Facsimile interface mode control 58 then causes facsimile data modulator circuit 82 to send facsimile connect signals via telephone line interface circuit 56 to the connected facsimile transceiver 12, commanding the facsimile transceiver to start transmitting image data. After these connection signals are sent, facsimile interface mode control circuit 58 causes selector switch 59 to connect telephone line interface 56 to image data demodulator circuit 64.

At this point the connected facsimile transceiver 12 starts sending image data, encoded in the form of audio tones, in a continuous flow, one page at a time; according to the facsimile data communications protocol established by international standards.

Image data demodulator circuit 64 converts these audible tones into digital image data which are stored in image data buffer 65. Periodically data packet assembler 62 accepts a packet of image data and assembles an information data packet for transmission. Because the effective speed at which data packet assembler 62 can assemble and dispatch information data packets varies depending on the effective through-put of the data link over the radio, image data buffer 65 provides sufficient data buffer capacity to store a substantial amount of facsimile image data.

As previously described, information data packets are normally transmitted at a higher information packet speed, requiring a shift in data rate before transmitting each packet. Upon decoding a valid reservation acceptance packet addressed to this unit, received data packet interpreter 80 sends a signal to radio data speed control 101 indicating that an information data packet is ready to be sent. Radio data speed control 101 then sends a signal to radio data modulator 72 to change its modulation speed to the information packet speed. Provided that the communications session is just beginning, the information packet speed is the highest available, for example, 9600 bps in a system providing data speeds of 300, 2400, 4800, 7200 and 9600 bps.

Data packet assembler circuit 62 now creates information packets which each include the following: the destination station address, as determined by destination address encoding circuit 61; the home station address, from home station address register 63; a control code indicating that the data packet contains facsimile image data; a sequence number generated by a sequence number generator circuit 83; and the facsimile image data. The sequence number generated by sequence number generator 83 is an arbitrary packet serial number which is incremented each time a packet is successfully transmitted. Each such data packet is passed to data check value calculator 66, which appends a CRC to the data packet, and forwards the modified data packet to transmit data packet register 67 as previously described.

The distant radio-facsimile communications station acknowledges each correctly received data packet by sending back an information acknowledgement data packet. Assuming that this information acknowledgement packet is received without error, it finds its way (via the stages previously described) to received data packet interpreter circuit 80. Received data packet interpreter 80 recognizes that this is an information acknowledgement packet, and signals data packet assembler 62 to assemble the next block of image data in image data buffer 65 for transmission. Upon decoding an information acknowledgement packet, received data packet interpreter circuit 80 also sends a signal to sequence number generator 83, which accordingly increments to the next sequence number, which will be embedded within the next succeeding information data packet. Received data packet interpreter circuit 80 also sends this packet acknowledgement signal to an acknowledgement timer circuit 84.

Each time that data packet transmit control 68 causes a data packet to be transmitted, it starts acknowledgement timer 84. The period of this timer is set to a time period long enough for the distant radio-facsimile communications station to receive the data packet, and to acknowledge it. If such acknowledgement is timely received, then the acknowledgement signal from received data packet interpreter 80 resets the acknowledgement timer 84 before the timer expires. However, if acknowledgement timer 84 times out without having received such acknowledgement signal, it sends a signal to data packet transmit control circuit 68 causing data packet transmit control circuit 68 to repeat transmission of the same packet. The purpose of acknowledgement timer circuit 84 is thus to prevent failure of the communications link in the event that an earlier packet transmission was not properly received and acknowledged.

It will sometimes happen that a transmitted data packet is correctly received by the distant radio-facsimile communications station, which sends back a suitable acknowledgement packet—but the acknowledgement packet encounters interference which causes its bits to be garbled. Such an acknowledgement packet will be rejected by data check decoding logic circuit 78, and will be discarded. After a time, acknowledgement timer circuit 84 will cause the same packet to be retransmitted. The distant receiving station may well then receive the same packet correctly for a second time. Herein lies the purpose of the sequence number generator circuit 83; the sequence number will not have incremented, so the receiving station will decode a duplicate sequence number. It reacknowledges the packet, but does not pass the duplicated data on the attached facsimile transceiver.

Each time that received data packet interpreter 80 detects a valid information acknowledgement packet, it sends a signal to success rate register 103, which increments a success event counter. Each time that acknowledgement timer 84 times out, indicating that a valid information acknowledgement packet has not been timely received, it sends a signal to success rate register 103, which increments a failure event counter. When the ratio of the failure event count to the success event count exceeds a preset level, for example, 1/10, then success rate register 103 sends a speed downshift signal to radio data speed control 101. Radio data speed control 101 then causes the next information data packet to be transmitted at the next lower available data speed. If radio data speed control 101 is already set to the lowest available data speed, it sends a disconnect signal to facsimile interface mode control 58, which disconnects the connect facsimile transceiver and terminates the message.

If the first information data packet to be transmitted on a new message session fails to be acknowledged, the failure to success ratio is 1/0, that is infinite, forcing an immediate downshift.

If, on the other hand, the failure to success ratio falls below a preset level, for example, 1/25, then success rate register 103 sends a speed upshift signal to radio data speed control 101. Radio data speed control 101 will then cause the next information data packet to be transmitted at the next higher data speed. If radio data speed control 101 is already set to the highest available data speed it will simply continue to operate at that speed.

When the originating facsimile transceiver 12 finishes sending a page, it drops its carrier (stops sending audible tones) and awaits a response. This loss of carrier is sensed by facsimile data demodulator circuit 64, which sends an appropriate signal to facsimile interface mode control circuit 58. Facsimile interface mode control circuit 58 switches selector 59 to connect telephone line interface 56 to facsimile data modulator circuit 82 and sends a response back to facsimile transceiver 12 indicating that it is ready to receive additional data. Facsimile interface mode control circuit 58 then switches selector 59 back to connect telephone line interface 56 to facsimile data demodulator circuit 64 to receive either the next page of facsimile images—in which case the above sequence continues; or a disconnect signal. Upon receipt of a disconnect signal, facsimile data demodulator circuit 64 sends a signal to facsimile interface mode control circuit 58, which in turn signals telephone line interface circuit 56 to disconnect from facsimile transceiver 12.

Even after originating facsimile transceiver 12 disconnects, image data will often remain as yet untransmitted with image data buffer 65. This data will continue being transmitted, packet by packet, until image data buffer 65 is empty. At that point, data packet assembler circuit 62 generates a message complete packet to the distant radio-facsimile communications station.

Assuming that the radio-facsimile communications station is idle, and that the operator of a distant radio-facsimile communications station wishes to send a facsimile message to this station, radio transceiver 16 receives a signal which results in digital data being detected by radio data demodulator circuit 76. Provided that data check decoding logic circuit 78 finds no data errors, station address decoding logic circuit 79 attempts to match the address in the packet received, with its own address contained in home station address register 63. Provided a match is found, received data packet interpreter circuit 80 detects a reservation request packet. If the unit is not already occupied, and channel reservation timer 102 is not counting down from any as yet unexpired channel reservation, received data packet interpreter 80 sends a signal to data packet assembler 62 instructing it to return a connect acknowledge packet to the originator. This packet is transmitted as previously described for other forms of data packet.

Received data packet interpreter 80 also decodes the information packet speed specified in the channel reservation packet, and sends a speed select signal to radio data demodulator circuit 76, preparing it to receive the information packet. Once radio data demodulator circuit 76 starts receiving an information packet, indicated by a carrier detect signal from radio channel carrier detect 77, and subsequently detects loss of the carrier detect signal from radio channel carrier detect 77, it reverts to its lowest demodulator speed, that is, the network packet speed.

Received data packet interpreter 80 also sends a connect signal to facsimile interface mode control circuit 58. Facsimile interface mode control circuit 58 in turn causes selector switch 59 to connect telephone line interface circuit 56 to a ring signal generator 85, generating a ringing signal to connected facsimile receiver 12. When facsimile transceiver 12 answers, it goes off hook, drawing loop current through telephone line interface 56, which is detected by off hook detect circuit 57, which in turn sends a signal to facsimile interface mode control circuit 58. Facsimile interface mode control 58 switches selector switch 59 to connect telephone line interface 56 to facsimile data modulator circuit 82; facsimile interface mode control 58 then causes facsimile data modulator circuit 82 to send facsimile connection signals via telephone line interface 56 to the connected facsimile transceiver 12, in effect commanding the facsimile transceiver to receive image data. After these connection signals are sent, facsimile interface mode control circuit 58 causes selector switch 59 to connect telephone line interface circuit 56 to image data demodulator circuit 64, which receives connection signals from facsimile transceiver 12. Upon conclusion of these signals, demodulator circuit 64 sends suitable connection signals to facsimile interface mode control circuit 58, which switches selector switch 59 to connect telephone line interface circuit 56 to facsimile data modulator circuit 82 one again.

The distant originating radio-fascimile communications station commences to send image data packets. As received data packet interpreter circuit 80 decodes each new image data packet, it sends a signal to data packet assembler 62 to return an acknowledgement packet to the originating station. Received data packet interpreter 80 also decodes the sequence number which is embedded within each image data packet, as previously described. It compares the received sequence number with the value previously stored in a receive sequence number register 86. If the sequence number is the same, then this is a duplicate image data packet (as described above), and it is discarded. If the sequence number received is different from the previously stored sequence number, then received data packet interpreter 80 stores this new sequence number in receive sequence number register 86, and then forwards the image data contained in this new packet to a receive image data storage circuit 81.

Whenever image data is available in image data storage 81, it is sent to facsimile data modulator circuit 82 for transmission through telephone line interface circuit 56 to connected facsimile transceiver 12.

When image data is not immediately available, receive image data storage circuit 81 sends a signal to a fill data timer circuit 87, which sends a signal to facsimile data modulator circuit 82 causing it to interpose fill bits in the data sent to facsimile transceiver 12. If the buffer empty signal from receive image data storage 81 persists for a predetermined period, fill data timer 87 sends a signal to data modulator circuit 82 causing it to transmit the signal for a single blank scan line on the print-out of facsimile transceiver 12; this signal is necessary to prevent facsimile transceiver 12 from disconnecting from the telephone line interface circuit 56 according to the inactivity time-out provisions embodied in the facsimile communications protocol.

At the end of the facsimile message, after sending the last image data packet, the originating radio-facsimile communications station generates a disconnect packet, as previously described. Upon receipt of a correctly formatted disconnect packet, received data packet interpreter 80 monitors the buffer empty signal generated by receive image data storage 81 until all previously receive image information has been sent to facsimile data modulator circuit 82, at which time received data packet interpreter 80 sends a disconnect signal to facsimile interface mode control 58. Facsimile interface mode control 58 proceeds to generate a disconnect sequence to attached facsimile transceiver 12 as previously described.

Figure 4:
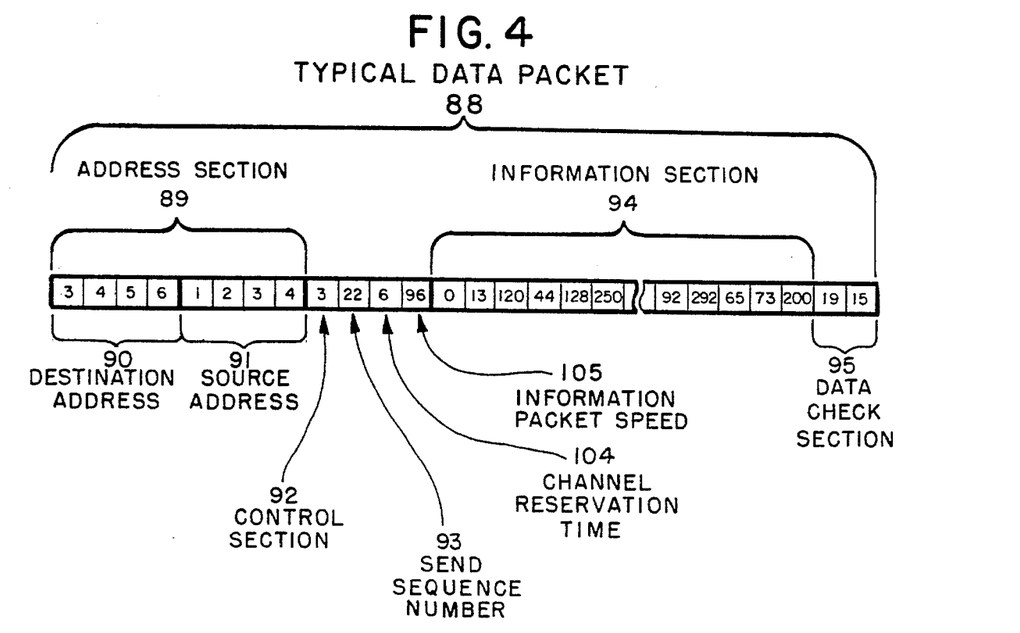
FIG. 4 illustrates the structure of a typical data packet, and the derivation of the cyclical redundancy check (CRC) value thereof.

FIG. 4 shows the structure of a typical data packet 88. Each of the small data blocks within the data packet 88 represents a conventional eight-bit binary number (or octet) which can take on values from 0 to 255. An address section 89 contains a destination station address 90, followed by a source station address 91. FIG. 4 shows each address having four digits, but the actual sizes of these address fields can vary, depending on the addressing schemes chosen by the users of the system.

A control section 92 contains a coded data value indicating the type of packet. For example, possible packet types include 1) channel reservation request; 2) channel acknowledgement; 3) information packet; 4) information acknowledge; and 5) message complete. Obviously, other packet types could be provided to achieve additional link control functions with the scope of the invention.

A send sequence number 93 is present only when the packet is conveying or acknowledging data, notably for an information data transfer or information acknowledge packet. It is an arbitrary number, 0 to 255, which is incremented each time a packet is transmitted and acknowledged. A channel reservation time value 104 and an information packet speed 105 are present only when the packet is requesting or acknowledging a channel reservation, notably for a channel reservation packet or reservation acceptance packet.

An information section 94 is present only when the packet is conveying data, notably for an information data packet. It may contain anywhere from a single eight-bit octet to over a thousand octets. These octets represent encoded facsimile images.

A data check section 95 contains a 16-bit cyclical redundancy check (CRC), generated at the transmitter. The 16-bit CRC is initialized to all binary 1's. Then the multi-bit binary number which represents the address section 89, control section 92, send sequence number 93 (if present), channel reservation time value 104, and information section 94 (if present), all combined, is divided by the binary polynomial $x^{16}+x^{12}+x^5+1$. The one's complement of the 16-bit remainder after the aforesaid division is transmitted as the CRC.

At the receiver, the 16-bit CRC is initialized to all binary 1's. The multi-but binary number (as defined above) actually received is first multiplied by $x^{16}$, then divided by the binary polynomial $x^{16}+x^{12}+x^5+1$. The 16-bit binary remainder resulting will be "0001 1101 0000 1111" ($x^{15}$ through $x^0$) in the absence of communications errors.

Thus a communications system is described which through use of a duplex packet transmission format, enables conventional facsimile apparatus to reliably communicate over a conventional two-way voice radio communication system without modification to either the facsimile apparatus or the transceiver apparatus of the radio communication system. In one preferred form, the system utilizes a novel packet protocol including data check and system control features which maximizes transmission accuracy and system efficiency, even under adverse conditions. The system uses adaptive speed control to permit transmission at optimum data speeds over the radio channel, and a channel reservation scheme to allow communications at differing speeds to take place in an orderly, non-interfering manner.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A communication interface controller operable in conjunction with a two-way voice radio transceiver of the type operable from audio input signals and transmit control signals and providing audio output signals, and a facsimile transceiver including a telephone line interface for developing analog output signals and receiving analog input signals, said interface comprising:

storage means for storing digital data signals;

first conversion means for converting the analog output signals from the facsimile transceiver to digital data signals for storage in said storage means;

second conversion means for converting digital data signals in said storage means to analog signals for application to the facsimile transceiver;

third conversion means for developing from said stored digital data signals an audio signal for application to the radio transceiver;

fourth conversion means for developing from the audio output signals of the radio transceiver a digital data signal for application to the digital storage means;

said audio output signals developed by said third conversion means for application to the radio transceiver being in data packet format, each data packet including at least one data check digit, and said third conversion means further including encoding means for encoding said data check digit in said developed audio output packets;

means in said fourth conversion means for decoding said data check digit in the audio output signal from the transceiver for verifying the integrity of received packets;

said third conversion means comprising means for generating a confirmation packet signal for application to the audio input of the radio transceiver upon receipt of a data packet from the radio transceiver including a valid check digit;

said fourth conversion means including means for receiving confirmation packets generated by a communicating interface apparatus; and said third conversion means being continuously responsive to receipt of said confirmation packet by said third conversion means for retransmitting said data packet in the absence of a confirmation packet by said fourth conversion means within a predetermined period of time, and for transmitting said data packets at a rate dependent on the proportion of confirmed data packet signals to unconfirmed data packet signals to compensate for changing conditions in radio transmissions with a communicating radio receiver.

2. A communication interface controller as defined in claim 1 wherein said third conversion means establish a predetermined initial data packet transmission rate, and increase said transmission rate upon said proportion of confirmed data packet signals to unconfirmed data packet signals rising above a first predetermined level.

3. A communication interface controller as defined in claim 2 wherein said third conversion means decrease said transmission rate upon said proportion of confirmed data packet signals to unconfirmed data packet signals falling below a second predetermined level.

4. A communication interface controller as defined in claim 1 wherein:

said first conversion means contains means for decoding the user's selection of the destination address of another interface controller, allowing the user to specify any of multiple interface controllers as the destination for a given facsimile transmission;

said third conversion means includes means for embodying a destination address within data packets; and said fourth conversion means includes means for extracting the destination address embodied in received data packets, comparing such address with the controller's assigned address, and discarding data packets not intended for this controller.

5. A communication interface controller as defined in claim 1 wherein each data packet developed by said third conversion means includes at least one address digit;

said third conversion means further includes encoding means for encoding said address digit in said audio packets;

said fourth conversion means includes means for decoding said address digit in received audio packets; and said third conversion means is inhibited for a predetermined period of time following receipt by said fourth conversion means of a data packet addressed to another interface controller.

6. A communication system operable in conjunction with a two-way voice radio transceiver operable from an audio input signal and a transmit control signal, and providing an audio output signal; and a facsimile transceiver including a telephone line interface for developing analog transmit signals and recognizing analog receive signals over a conventional voice telephone line, and having a unique system address, said system comprising:

storage means for storing digital data signals;

first conversion means for converting said analog transmit signals to digital data signals for storage in said storage means for transmission, and for converting digital data signals in said storage means to said analog receive signals for application to said facsimile transceiver for reception;

second conversion means for developing from said stored digital data signals an audio input signal for application to said two-way voice radio transceiver for transmission; and for developing from said audio output signal a digital data signal for application to said digital storage means for reception;

said audio output signal developed by said second conversion means for application to the radio transceiver being in packet format, each packet including at least one address digit, and said second conversion means further including encoding means for encoding said address digit in said developed audio output signal, and for decoding said address digit in the received audio output signal;

packet transmission means for transmitting said packets; and means for inhibiting said transmission means for a predetermined period of time following receipt of a packet addressed to another facsimile receiver within the system.

* * * * *